United States Patent [19]

Grecco et al.

[11] Patent Number: 5,608,791
[45] Date of Patent: Mar. 4, 1997

[54] GROUP EXCHANGE PORT (GXP)

[76] Inventors: Joseph Grecco, 238 Nedeller Dr., Saddle Brook, N.J. 07662; Charles Manning, 26 Karangi Rd., St. Heliers, Auckland, New Zealand; Paul Ranford, 19 Wairere Ave., Mt. Albert, Auckland, New Zealand

[21] Appl. No.: 192,668

[22] Filed: Feb. 7, 1994

[51] Int. Cl.$^6$ ...................................................... H04M 3/00
[52] U.S. Cl. ........................... 379/265; 379/384; 379/201
[58] Field of Search ................................ 379/34, 94, 196, 379/197, 198, 201, 213, 214, 233, 221, 265, 266, 384, 95

[56] References Cited

U.S. PATENT DOCUMENTS

| | | | |
|---|---|---|---|
| 5,008,930 | 4/1991 | Gawrgs et al. | 379/96 |
| 5,018,191 | 5/1991 | Catron et al. | 379/100 |
| 5,179,585 | 1/1993 | MacMillan, Jr. et al. | 379/88 |
| 5,206,903 | 4/1993 | Kohler et al. | 379/309 |
| 5,299,260 | 3/1994 | Shaio | 379/210 |
| 5,315,634 | 5/1994 | Tanaka et al. | 379/95 |
| 5,381,470 | 1/1995 | Cambray et al. | 379/218 |
| 5,444,774 | 8/1995 | Friedes | 379/214 |

OTHER PUBLICATIONS

Solaris Teleservices 1.0 API Programming Guide. 1993.

*Primary Examiner*—Thomas W. Brown
*Assistant Examiner*—Daniel S. Hunter

[57] ABSTRACT

A Group Exchange Port (GXP) is disclosed which provides an organized technique for passing control of live objects (e.g.; a telephone call, a robotic arm, flying aircraft, etc.) from a first application operating on and processing the object to a second such application. In accordance with the invention, a Group Exchange Port is provided where buyer applications register there willingness to accept control of the system and sellers may "advertise" an object for sale. When a suitable buyer (i.e.; one that has the proper resources for servicing and controlling the active system) is found, control of the object is passed from the seller to the buyer. Importantly, the GXP requires that control of the object always be maintained by one and only one application, that control not be passed to an application which cannot properly service and/or control the system, and that an application presently controlling the system does not relinquish such control until a new application accepts such control. The technique allows loosely coupled applications to work with the same object.

24 Claims, 5 Drawing Sheets

| 301 STEPS | 302 SELLERS | 303 GXP | 304 BUYERS | 305 PHASE |
|---|---|---|---|---|
| 310 | PERFORM NORMAL CALL PROCESSING | | REGISTER AN INTEREST WITH THE GXP TO ACCEPT GROUPS. | NOT FOR SALE, OWNED BE SELLER |
| 311 | PRESENTS GROUP FOR SALE BY INFORMING GXP. | | | |
| 312 | | NOTIFIES SELLER WHEN A REGISTERED BUYER IS FOUND | | POTENTIAL SALE |
| 313 | INFORMES GXP TO PROCEED WITH NEGOTIATION. | | | |
| 314 | | NOTIFIES THE BUYER WHICH GROUP IS AVAILABLE. | | NEGOTIATION |
| 315 | | | INSPECT GROUP. | |
| 316 | | | NOTIFY THE GXP WHETHER IT ACCEPTS OR REJECTS THE GROUP | |

*FIG. 3A*

| | | | |
|---|---|---|---|
| 317 | | INFORMS THE SELLER OF THE ACCEPTANCE OR REJECTION OF THE GROUP | |
| 318 | IF THE OBJECT WAS ACCEPTED, PERFORME ANY CLEANUP ACTIONS REQUIRED AND INFORM THE GXP TO RELEASE THE OBJECT TO THE BUYER. SELLER IS NO LONGER ABLE TO MODIFY OR ACCESS THE OBJECT RELEASED. | | |
| 319 | | NOTIFY THE BUYER OF THE RELEASE | SOLD |
| 320 | | | NOW FULLY RESPONSIBLE FOR THE GROUP AND IS ABLE TO MODIFY THE GROUP |

TABLE 300

GROUP EXCHANGE PORT (GXP)

TECHNICAL FIELD

This invention relates generally to a system for allowing different applications to operate on an object (e.g.; a telephone call, a robot arm, etc.), and specifically, to a technique for providing negotiated passing of an object from a first application to a second application. (The object is termed herein a "live object" and is defined later in this patent application.) The inventive technique is particularly useful in telecomputing and call processing systems, where independent call processing applications (e.g.; fax, automated attendant, etc.) often must control and service the same telephone call.

BACKGROUND OF THE INVENTION

For purposes of explanation herein, we define a "live object" as a system that has parameters and\or resources associated with it and which may be operated upon (e.g.; modified) by applications from sources outside of the live object. Such objects are usually operated upon by numerous applications at various times. Additionally, it is noted that in some systems, the applications may be very different from one another, and substantially independent.

Consider for example, a call processing\telecomputing system. In such a system, the call is the live object, and the various applications may include facsimile, technical support, automated attendant, etc. The call may initially be directed into a first application (e.g.; automated attendant), which performs one or more functions, and then be passed to a second application (e.g.; fax) for other functions. Thus, the different applications operate upon the call at different times as the call progresses, or stated from the perspective of the call, access to the object is passed from one application to another as the call progresses.

In prior art systems, there exists no orderly manner in which to pass live objects from one application to another. As a result, passing of live objects is often done on an "ad-hoc" basis. The different applications must be tightly interwoven, and control of the object is often interrupted, usually resulting in caller frustration.

Moreover, applications such as fax, automated attendant, etc. which are written by different vendors are independent from one another and therefore difficult to integrate. Even if these independent applications are integrated, the resulting system is not modular because the applications are so tightly interwoven. Thus, it is difficult to add new applications to the call processing system (or remove old ones) without affecting the entire system.

The problem is even more pronounced when applications are remote with respect to one another. Specifically, when the applications run on separate hardware which communicates over a network (e.g.; LAN, WAN, etc.) passing of the object from one application to another becomes quite problematic. Additionally, since the live objects tend to generate events that are asynchronous with respect to the applications, the problem is even more pronounced. In short, prior art call processing systems which include multiple applications often operate more like one large computer program with different subroutines than they do like a set of independent and modular applications.

It can be appreciated that there exists a need in the art to provide a method and apparatus for the orderly passing of live objects from one application to another. (When we speak herein of passing an object, we actually mean passing control and\or access to the object and its associated group, as will be explained hereafter.) The solution should preferably allow call processing systems to be built and grown modularly from a variety of independent applications.

SUMMARY OF THE INVENTION

The above and other problems of the prior art are overcome in accordance with the teachings of the present invention which relates to a method and apparatus for the orderly passing of live objects from one application to another. For purposes of explanation, we define a "buyer" application as an application to which the live object potentially will be passed, and a "seller" application as an application presently in control of the live object (the terminology used throughout this application assumes an analogy to a "want-ad" section in a newspaper, which analogy will be clarified later herein). The method and apparatus by which passing from the seller application to the buyer application is effectuated is termed the Group Exchange Port ("GXP").

In accordance with the invention, it is recognized, and it will be appreciated by the reader from the examples and explanation provided later herein, that a protocol for the orderly passing of live objects from one application to another should ensure that:

1. One and only one application is in control of the live object at any one time.
2. The live object is not passed to an application that can not provide adequate control.
3. An application presently controlling the live object does not relinquish control until a new application accepts control.

A telecomputing system which follows the above rules will ensure that a caller will always be in contact with an application, and will never be left "hanging".

With the above preliminary description as background, we turn now to the present invention. In accordance with the invention, numerous buyer applications register with the GXP, thereby indicating their availability to take control of live objects. When a seller desires to pass an object, it informs the GXP (i.e.; it advertises the object for sale), and the GXP, in conjunction with potential buyers, determines which buyer should accept the object. While such determination is being made, control of the object remains with the seller.

When a potential buyer is found, the buyer may inspect the group of parameters and resources associated with the object to determine whether he can accept the object (i.e.; whether the buyer has the proper resources to control and service the object). If the buyer can accept the group, the GXP then informs the seller that a buyer has been found. Next, the seller issues a release, and simultaneous with the issuance of the release, the seller relinquishes the object and the buyer acquires it. After such a release is issued by the seller, the seller may no longer control the object in any way and the buyer must control the object. Prior to such a release, the buyer may not control the object and the seller must control the object. If, after inspecting the group, the buyer determines that it will not accept the group, then a new potential buyer is found. While a proper buyer is being located, the object remains with the seller.

Returning to the three rules set forth previously herein, and comparing the above described technique to these three rules, it is noted that the inventive technique meets all of the rules. First, the buyer may not assume control until the object is released by the seller, and the buyer must assume control immediately upon the release of the object by the seller. Conversely, the seller must maintain control prior to issuing the release, and must relinquish control after the release. Thus, one and only one application is in control of the object at any one time.

Concerning the second requirement, the GXP only passes objects to "willing" buyers; i.e.; buyers with the proper resources to control the object and/or with capability to acquire such resources. Third, the seller is not allowed to relinquish control until the buyer has accepted control. By satisfying all of the rules, the system allows for the orderly passing of objects from one application to another.

Numerous optional enhancements and modifications to the method are disclosed. One such option includes a technique for quickly matching buyers and sellers with one another, even in the presence of multiple buyers and multiple sellers. Another enhancement includes restricting access to the GXP for security purposes. Additionally, resources associated with the group may be deleted upon passing of the group from a seller to a buyer and resources not associated with the group may be added to the group upon the passing of the object from seller to buyer. Other variations include imposing time constraints upon the passing of objects, and passing limited access to the object rather than the entire object.

DETAILED DESCRIPTION OF THE PREFERRED EMBODIMENT

The GXP mechanism described herein can be conceptually thought of as a "want-ad" system in the newspaper. Buyers register a willingness to accept objects the way a buyer of merchandise would register his interest by ordering the newspaper. Sellers advertise objects for sale with the GXP the way a seller would place an ad in the want-ad section. Before buying the merchandise, the buyer would inspect the advertised merchandise to be sure it is what he needs. Similarly, as further described below, buyer applications inspect the resources and/or parameters associated with the live object to be passed in order to ensure that the buyer wishes to accept the object.

Figure 1:
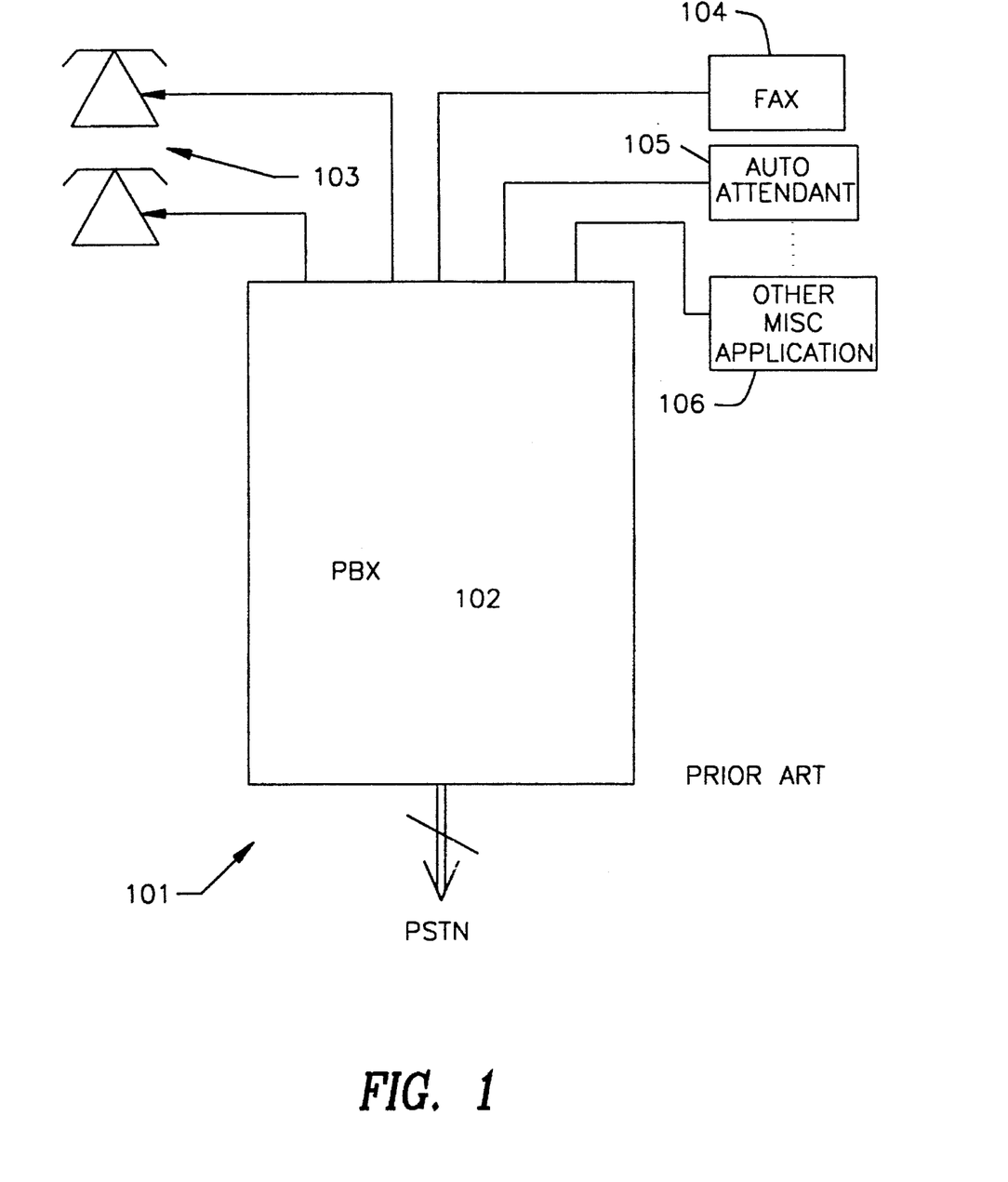
FIG. 1 is a block diagram of a typical prior art telecomputing arrangement, including an optional PBX.

FIG. 1 shows an exemplary prior art telecomputing arrangement 101 including a fax application 104, an automated attendant application 105 and a block 106 that indicates there are numerous other applications optionally present in the system. The arrangement of FIG. 1 further includes voice terminals 103. All applications are interconnected via the Private Branch Exchange (PBX) 102 as shown.

In operation, calls arrive and are routed to one of the applications for control and processing. During the course of a call, the remote caller (not shown) may wish to be serviced by another application for additional processing or the application presently processing the call may determine that the call should be passed as stated previously. Prior systems such as that of FIG. 1 have no organized technique to accomplish such a passing. PBX 102 may simply disconnect the call from one application and reconnect it to another. Any parameters associated with the call and established during processing by the first application may be lost. Thus, if the caller entered an account number, for example, to the first application, the number may have to be reentered to the second application. Additionally, parameters such as Automatic Number Identification (ANI) or elapsed call time may simply be unavailable to the application to which the call is being passed.

Figure 2:
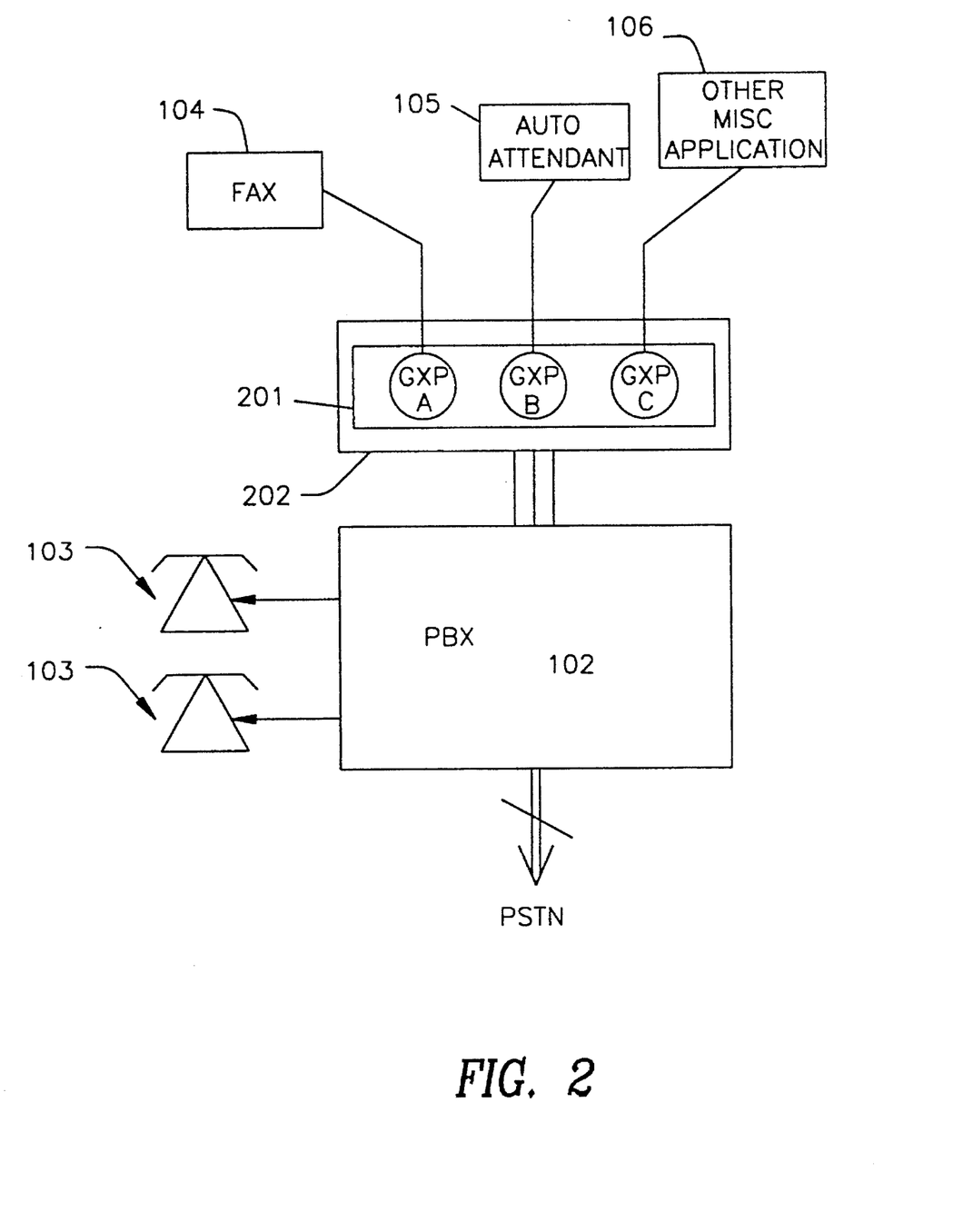
FIG. 2 shows a block diagram of a GXP incorporated into a telecomputing arrangement.

FIG. 2 shows an exemplary telecomputing system using the present invention. The arrangement of FIG. 2 is similar to that of FIG. 1 except that telecomputing server 202 is present between the applications and the PBX. Each of GXPs a-c is associated with a different type of application. For example, GXP (a) is the fax GXP.

Before proceeding with the explanation of FIG. 2, several preliminary issues should be addressed. First, while a separate block 201 is shown, it should be noted that the GXP system 201 would preferably be implemented in software, and may actually run on the same hardware as one or more of applications 104–106. Additionally, the applications are shown as each being separately connected to GXP system 201 but a local area network, wide area network or any other network can be used to link all of the applications together and\or to link the applications to the GXP. Furthermore, it should be noted that the PBX 102 is an optional part of the system and is only shown for explanatory purposes.

In order to better understand the following description, we define three types of access passing: (i) full, (ii) control, and (iii) monitoring. An application is said to pass full access of a call if all monitoring and control of call parameters and resources are passed to the buyer application. An application is said to pass monitoring access to a buyer application if the buyer application is passed the ability to monitor one or more parameters and resources of the call, but is not permitted to control or alter them. Finally, control access may be passed to the buyer but monitoring access retained by the seller.

As is known to those of ordinary skill in the telecomputing art, each of the applications shown in FIG. 2 requires certain parameters and/or resources in order to properly process the call. For example, if parameters associated with the call indicate that the remote caller is utilizing a 9,600 baud modem, then fax application 104, in order to communicate with this remote application, would require a modem capable of receiving at 9,600 baud. Of the numerous applications shown in FIG. 2, some may require modems, some may require modems of particular speeds, other applications may, in certain circumstances, require text to speech capability, or other such telecomputing functions. As will be described later herein, one key aspect of the present invention is that calls are not passed to an application which does not have the proper resources for handling such calls.

Turning now to the description of the GXP system 201, the GXP is an organized and restricted protocol for passing calls from one of applications 103–106 to other ones of these applications. The technique is best described via a table 300 shown in FIG. 3. The columns 301–305 represent the various components of a telecomputing system. The rows 310–320 represent the sequence of steps executed to pass a call from a seller to a buyer. The ordered pair a:b in the following text represents row a, column b from the table in FIG. 3. While the pass of one call is represented by table

300, it is understood that in actuality, there would likely be multiple calls being processed and passed. Additionally, we will first describe full access passing with reference to FIG. 3.

Each live object has a set of parameters and resources associated with it. For example, the object may have information associated with it that indicates a 9600 baud modem is required by any buyer who will accept the call. Other parameters associated with the call may include ANI data or information entered by the user, via DTMF tones, such as an account number. The entire set of parameters and resources associated with a live object is called a group. We refer herein to an object or to a group. When we refer to a group, we mean that group of parameters and resources associated with the object under discussion.

Figure 3A:
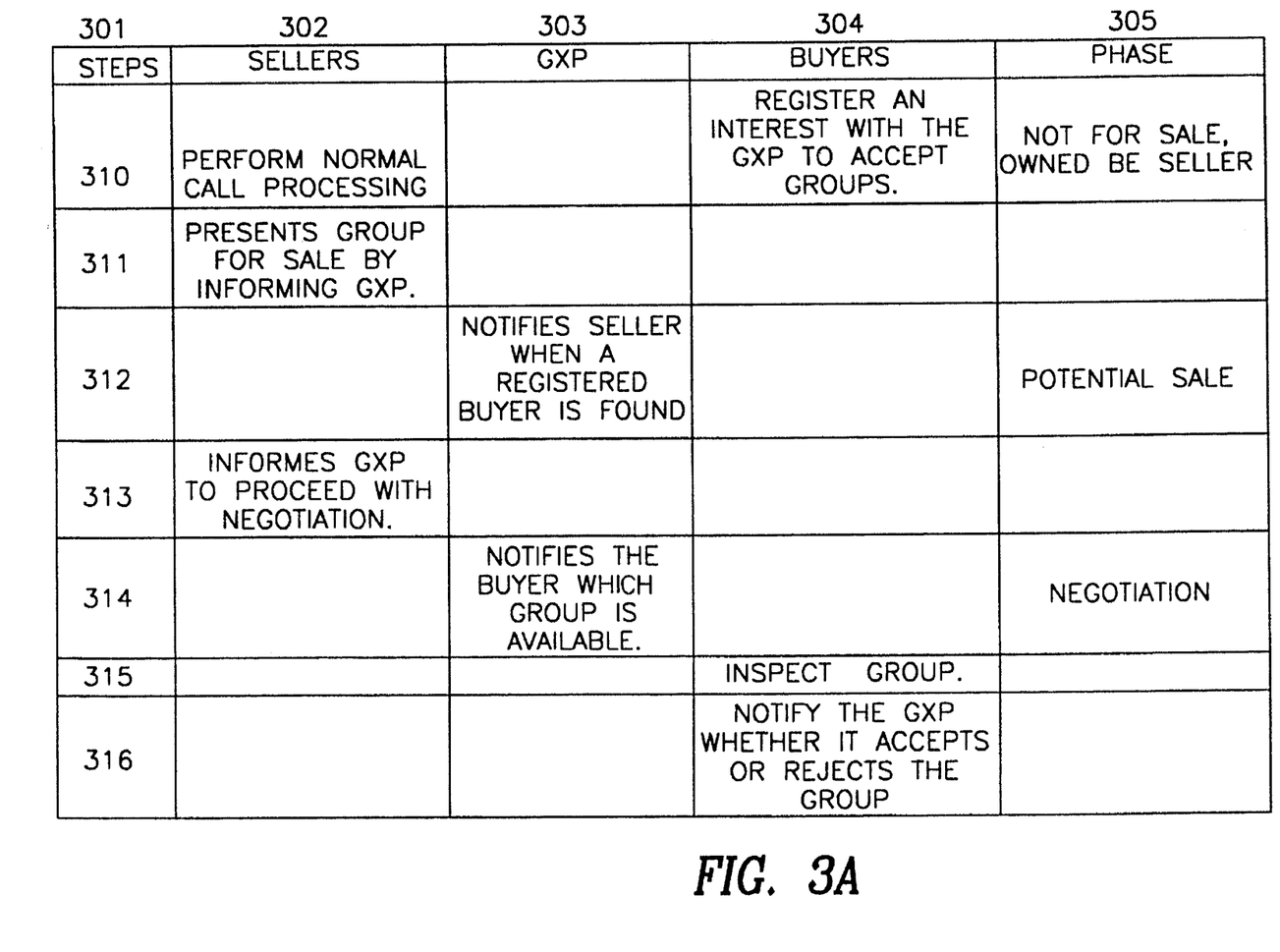
FIG. 3 shows a table of the relevant steps that an exemplary GXP would execute to implement the inventive technique in a call processing environment.
Figure 3B:
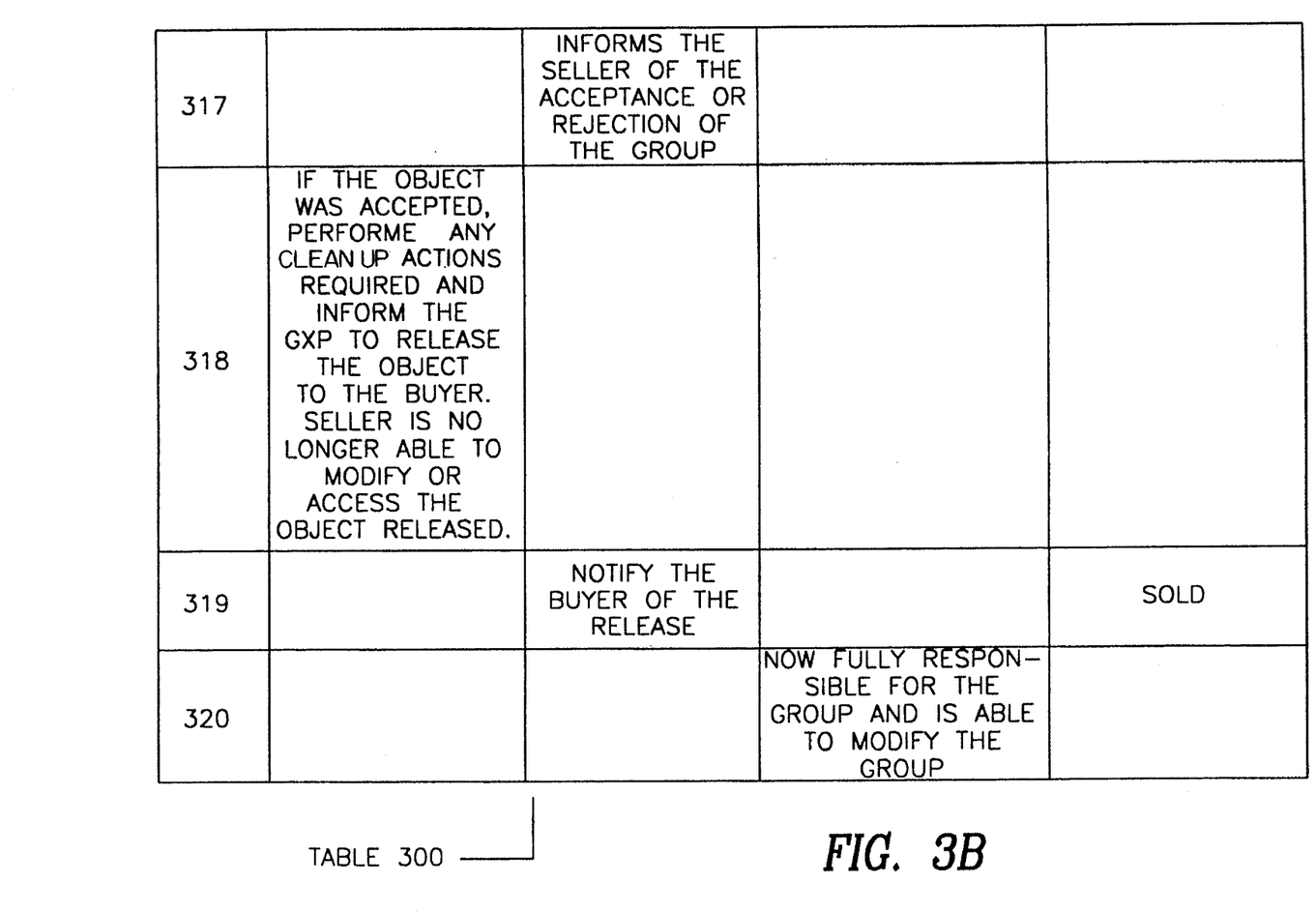

Referring to FIG. 3, step 310 indicates that the seller is processing a call as requested by the user, and no request for passing the call to a buyer has occurred. Buyers register with the GXP indicating their interest in purchasing calls. Such registration may be accomplished by the GXP maintaining a data structure indicating which applications are available to accept calls. One technique is to simply maintain a queue of identifiers, where each identifier is associated with a different buyer.

It is noted that step 310 shows the registration of buyers at the time that the sellers are performing normal call processing. This should not be taken to mean that blocks 310:302 and blocks 310:304 must occur simultaneously. In actuality, the more likely scenario is that each GXP simply maintains two queues, one for buyers, and one for sellers. During the course of call processing of the numerous calls, there may be times when numerous sellers in the queue are waiting for a buyer, numerous buyers are waiting for a seller, or when there are both buyers and sellers but no matching pairs thereof. The entire system can be viewed conceptually as a set of two queues, the number of entries of each fluctuating up and down as calls are received, processed, passed, and terminated.

In step 311, the seller decides to pass the call to another application and presents a "for sale" sign to the appropriate one of GXPs a, b, or c. Such action could, for example, be done in response to a remote caller entering a DTMF sequence indicating his desire to interact with a specified application. Of course, in actuality, this sign is in the form of a specially encoded message from the seller to the GXP. The message may also indicate the address of a group of parameters and resources associated with the call. We also note that while we discuss the for sale sign being sent to one GXP, the for sale sign can be sent to multiple GXP's as more fully described later herein.

To remain with our example, let us assume that the seller is an automated attendant application and the buyer is a fax application. In step 312, if the GXP finds at least one fax application registered with the fax GXP, then it will notify the seller that a potential buyer exists. As indicated at block 312:305, the call is now in a potential sale phase.

At step 313, if the seller still wishes to pass the call, the seller instructs the GXP to proceed with the negotiation of the pass. In response to that instruction and at step 314, the GXP notifies the buyer of the group address of the group associated with the call to be passed. This initiates the negotiation phase as indicated by 314:305.

During negotiation, events are not lost. Preferably, during the negotiation, events such as DTMF tones entered by the user, the caller hanging up, etc., are logged by the GXP but not passed to either the buyer or the seller application. If the call is reclaimed, the events are sent back to the seller. If the call is passed, the events may be sent to the buyer with the object. Holding events at the GXP eliminates the loss of events which occur at a boundary condition (i.e.; exactly when the call is passed).

Importantly, the seller is not allowed to relinquish the object during the negotiation phase. Therefore, the call (i.e.; the live object) is not left unattended. Additionally, during the time that the pass is being negotiated, the seller can not modify the object. By preventing such modification by the seller, the system avoids a situation whereby a buyer inspects a group, assumes it has the proper resources to accept it, and then is passed control of a modified group for which it does not have the proper resources.

At step 315, the buyer inspects the group to determine if the group can be processed by the buyer. For example, the group may include a baud rate parameter of 9600. If the buyer can operate only at 2400, the buyer can not process the group. Depending upon the results of the inspection, the buyer notifies the GXP at step 316 as to whether or not it can process the group and associated object, or equivalently, whether it accepts or rejects the group. If the buyer rejects the group, the GXP will allow another possible buyer to inspect the group, until a buyer is found which accepts the group. If and when a buyer accepts the group, step 317 shows that the GXP would then inform the seller of the acceptance of the group.

At step 318, after the seller is notified of the buyer's acceptance of the group, the seller may perform any clean up operations required. For example, if the seller is an automated attendant application currently playing music to the user until the call can be passed, the clean up operation may include stopping the music or playing a message such as "Your call will now be passed to a fax application." After the cleanup operation is performed, the seller releases the group, meaning that the seller no longer has any control over the group at all.

Step 319 shows that the buyer is then notified of the release (the sold phase in 319:305) and at step 320, the buyer is now fully responsible for the call. The amount of time between the seller's release of the call and the buyer being notified thereof is negligible so that for all intents and purposes, control of the call passes immediately from the seller to the buyer.

Although the seller may reclaim the group any time prior to release, once released, the seller cannot reclaim the group. Moreover, once released, the buyer must maintain control of the group until the buyer sells the group to another buyer or the group no longer exists (e.g.; the call is terminated or the group is destroyed by accident).

While the seller can reclaim the group any time prior to release, the buyer can withdraw its registration to accept groups any time prior to acceptance. Thus, if the buyer registers an interest but then its resources are later consumed, it simply informs the GXP that it is no longer available. The GXP will have to find another buyer to which to pass the application.

It can be seen from the table in FIG. 3 that an orderly pass of the call is effectuated from a first application to a second application. The call is under the total control of a single application at all times, and is only passed to applications which can control the call and properly process it.

It is also noted that parameters associated with the call are passed from the seller to the buyer application. As a result, the technique has the added advantage that information entered during the processing of the call by the seller application can be passed to the buyer application and changes to the state of the object can also be passed. For example, the buyer application can be passed the elapsed time of the call, ANI data, etc.

There are numerous variations of the above technique which would ensure that the passing of the call occurs in an orderly fashion. One such variation is to "collapse" steps 312–314. Specifically, when the GXP finds a buyer, it would notify the seller that a buyer is available and then notify the buyer of the particular group available. Thus, the seller implicitly informs the GXP, when the seller advertises the group for sale, to proceed with the negotiation.

Another optional enhancement relates to an algorithm for matching buyers and groups. Specifically, while the above description details the pass of a single telephone call from a seller to a buyer, it is noted that in an actual GXP, there may be numerous sellers trying to pass groups, and there may by numerous buyers registered. It would therefore be desirable to have an organized and efficient technique for matching buyers to sellers.

One example of such a technique involves three basic steps. First, a list of registered buyers and pending objects for sale is maintained. Second, whenever a buyer registers with the GXP, the buyer checks all pending groups until it finds one it can accept. If it does not find any such group, the buyer is simply added to the list of registered buyers. Third, each time a group is placed up for sale, each buyer is allowed to inspect that group until a buyer is found which accepts that group. If no buyer is so found, then the group is simply added to the list of pending groups for sale. In the above manner, it is insured that buyers and sellers are quickly paired off, and waiting time for call pass is minimized.

Another optional enhancement allows the GXP to be provided with an access control. Specifically, the GXP may reject attempts by an application to utilize the GXP for passing of the live object. The GXP may use any parameters from either the group, the buyer, the seller, or any other part of the system in order to restrict passing of the object by, or access to, a GXP. In a call processing environment, if the GXP determines that the seller automated attendant application is presently playing back a message, it may restrict or prohibit call passing until the message is completely played back.

Figure 4:
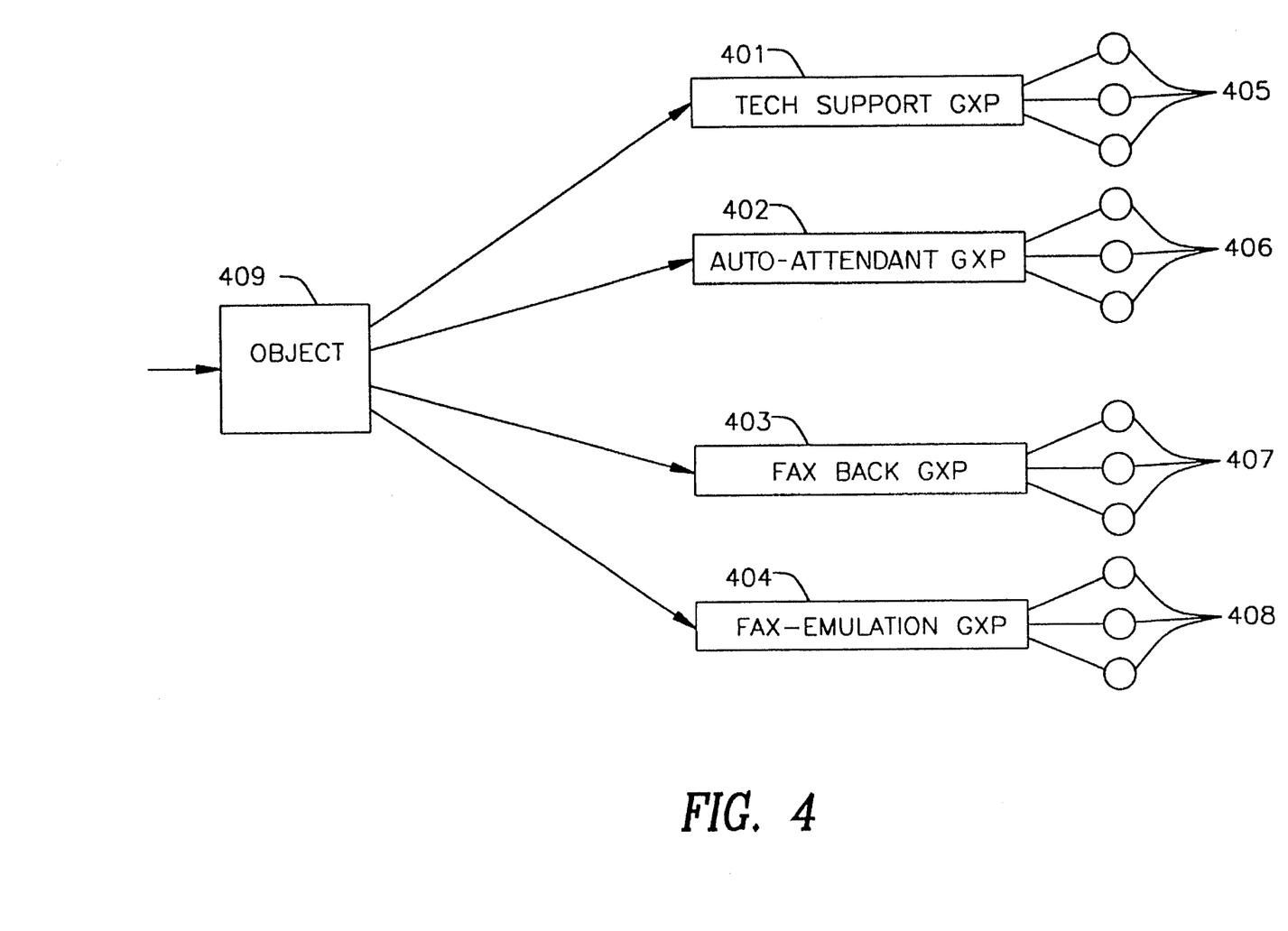
FIG. 4 shows an arrangement whereby each GXP is connected to a plurality of buyers.

We also note that a plurality of GXPs, each of which is associated with plural applications of a similar type, may work in conjunction, each GXP servicing a different type of application or passing different kinds of groups and each GXP including a plurality of similar applications. Referring to FIG. 4, consider a telecomputing system with four types of applications: (1) technical support applications 405, (2) automated attendant applications 406, (3) fax-back information service 407, and (4) fax machine emulation capabilities 408. For each type of application, there are several individual such applications (e.g.; three different automated attendant applications 406).

Such a telecomputing system should preferably have four GXPs 401–404 as shown. When a seller application wants to pass a call, it advertises the call object 409 in the GXP associated with the type of application to which the call is to be passed. For example, if a seller wants to pass the object 409 to a automated attendant application, it places the object 409 in the automated attendant GXP. Each GXP need only be concerned with a few applications, all of which are similar to one another.

As an additional optional enhancement, the passing of an object may include "soft" detachment/attachment of the system resources. Specifically, there may be one or more resources required by the buyer to process the call, but which are not required by the seller to process the call. Conversely, there may also be resources required by the seller to properly process the call, but which are not required by the buyer.

In the case of the soft detachment, when the group is offered for sale at the GXP, the seller indicates which of the resources presently included in the group are not to be included when the group is actually passed to the buyer. Thus, when the buyer inspects the group to determine if it can accept the call for processing, the buyer considers the group as if these resources where not present at all. If, on the other hand, the seller reclaims the group, then these resources remain attached to the group.

In a soft attach pass, buyers may indicate to the GXP which resources must be allocated to a call before that call will be accepted by the buyer. Calls advertised for sale may not have these additional resources, but the GXP will not attempt to pass the group to the buyer unless these additional resources can be allocated.

The soft attachment may be performed by the GXP in which case the buyer specifies the resources to be attached when registering an interest in buying calls. Alternatively, any resources that the buyer attaches during the buyer inspection part of the negotiation phase may automatically be allocated by the GXP prior to call passing. Such resources would be released if the call is reclaimed by the seller.

Several variations and/or enhancements provide an even more flexible system. First, it is noted that a seller can advertise a call for sale in more than one GXP. That is, a group can be advertised for sale in multiple GXPs, and a buyer from any one of the GXPs may accept the call. Of course, once the call is accepted, it maybe desirable to delete this call from any other GXP in which it is advertised. Conversely, buyers can also accept calls from multiple GXPs, provided such buyers have the proper resources to process calls received from these GXPs.

Another variation allows the seller to pass limited access to the buyer. For example, the buyer may be passed control of the group, yet the seller maintains monitoring capability. Conversely, a buyer may be passed monitoring capability yet the seller maintains control. In such a situation, backup applications would be available in the case that the controlling application "crashes". Specifically, if the application presently in control of a group crashes, the GXP could offer control to a group which has monitoring capabilities and/or which previously had control.

Consider a call processed by application 1 but control of the call is passed to application 2. Application 1 maintains monitoring capability. Next, control of the call is passed from application 2 to application 3, while application 2 maintains monitoring capability. If application 3 crashes, application 2 can be offered control of the call by the GXP. If application 2 does not accept such control, then application 1 can be offered such control. In general, if the application presently controlling the call "crashes" it may be desirable to offer control of the call to previous applications which presently only have monitoring capabilities but which may have previously had control. In this manner, control will be passed to an application that is aware of the call state and the parameters associated therewith.

Other variations and additions will be apparent to those of ordinary skill in the art, and such variations are intended to be covered by the following claims.

We claim:

1. In a communication system, a method of passing a telephone call requiring control from a first application, denoted a seller, presently having full access to and control of said telephone call, to a second application, denoted a buyer, through a Group Exchange Protocol (GXP), each of said buyer and seller having one or more hardware and software resources, the method comprising the steps of:

registering at least one buyer with the GXP, thereby informing the GXP that the at least one buyer is available for accepting control of or access to said telephone call to be passed;

passing to said buyer information indicative of hardware and software resources required for control of or access to said call; and granting said control of or access to said buyer only if said information indicates that said buyer possesses said required hardware and software.

2. The method of claim 1 further comprising the step of communicating a message to the GXP indicating that the seller has a telephone call to be passed to a buyer prior to said step of passing.

3. The method of claim 2 wherein said telephone call includes an associated group of parameters.

4. The method of claim 3 wherein commands received from a user prior to said step of granting are stored and passed to said buyer when control of or access to said telephone call is granted.

5. The method of claim 4 wherein said granting step includes the step of passing control of said telephone call.

6. The method of claim 5 further comprising the step of changing the parameters and resources associated with said call prior to said step of granting but subsequent to said step of communicating.

7. The method of claim 4 further comprising the steps of:

maintaining a list of conditions under which said step of granting should not be permitted even if said buyer possesses said hardware and software resources; and examining said list prior to said step of granting; and preventing said step of granting in response to said step of examining indicating that said conditions are met.

8. The method of claim 4 further comprising the step of notifying the seller, prior to said step of granting, if said buyer possesses said required hardware and software.

9. In a communication system, a method of passing control of a telephone call having an associated group of parameters and resources from a first application, denoted a seller, presently having full access to said telephone call, to a second application, denoted a buyer, through a plurality of group exchange protocols (GXP), the method comprising the steps of:

registering at least one buyer with said plurality of GXPs, thereby informing the GXPs that the at least one buyer is available for accepting the telephone call to be passed said step of registering including the step of changing, as necessary, the group of parameters and resources;

communicating a message to the GXPS indicating that the seller has a telephone call to be passed to a buyer;

examining the associated group to determine if said buyer includes resources sufficient to control said call;

if so, determining that said buyer is to be granted control of said telephone call;

granting said control to said buyer only after said steps of examining and determining indicate that said buyer is capable of accepting control of said telephone call, said step of changing occurring prior to the step of granting but subsequent to the step of communicating.

10. The method of claim 9 wherein said step of registering comprises the step of checking to see if any of said communicated messages indicates that a telephone call to be passed is suitable for said buyer registering.

11. The method of claim 9 wherein said step of communicating comprises the step of checking to see if any of said registered buyers are suitable for accepting said telephone call.

12. The method of claim 10 wherein said step of communicating comprises the step of checking to see if any of said registered buyers are suitable for accepting said telephone call.

13. A Group Exchange Port (GXP) apparatus for passing a communications session from a first application, denoted a seller, presently having access to said communications session, to a second application, denoted a buyer, said apparatus comprising:

means for registering at least one buyer with the GXP, thereby informing the GXP that the at least one buyer is available for accepting the communications session to be passed;

means for receiving information indicative of whether said buyer possesses hardware and software required to manage said communications session, and for determining that said buyer is to gain access to said communications session;

means for passing access to said communications session from said seller to said buyer only after said means for receiving and determining indicates that said buyer is capable of accepting said communications session.

14. Apparatus of claim 13 further comprising means for communicating, to the GXP, a message indicating that the seller has a communications session to be passed to a buyer.

15. Apparatus of claim 14 wherein said communications session includes an associated group of parameters.

16. Apparatus of claim 15 wherein commands received from a user prior to passing access are stored and passed to said buyer when control of or access to said telephone call is granted.

17. Apparatus of claim 16 wherein said means for determining includes means for examining the group to ascertain whether or not said buyer is capable of accepting the call.

18. Apparatus of claim 17 wherein said means for passing includes the means for passing control of said communications session.

19. Apparatus of claim 18 further comprising means for changing the parameters and resources associated with said call prior to granting access thereto.

20. Apparatus of claim 16 further comprising:

means for maintaining a list of conditions under which passing should not be permitted; and means for examining said list prior to passing; and means for preventing passing by said means for passing in response to an indication that said conditions are met.

21. A Group Exchange Port apparatus for passing control of a telephone call having an associated group of parameters and resources from a first application denoted a seller, presently having control of said telephone call, to a second application, denoted a buyer, said apparatus comprising:

means for registering at least one buyer with a plurality of GXPs, thereby informing the GXPs that the at least one buyer is available for accepting control of the telephone call;

means for communicating to the GXPs a message indicating that the seller has a telephone call to be passed to a buyer;

means for determining that said buyer is to accept control of said telephone call by examining the group;

means for passing control of said telephone call from said seller to said buyer only after said means for determining indicates that said buyer is capable of accepting control of said telephone call;

means for storing commands received from a user and for passing said commands to said buyer when said means for passing passes control of said telephone call; and means for changing parameters and resources associated with the call prior to passing control but subsequent to communicating said message.

22. Apparatus of claim 21 wherein said means for registering comprises means for checking to see if any of said communicated message indicates that a telephone call to be passed is suitable for said buyer registering.

23. Apparatus of claim 22 wherein said means for communicating comprises means for checking to see if any of said registered buyer are suitable for accepting said telephone call.

24. Apparatus of claim 21 wherein said means for communicating comprises means for checking to see if any of said registered buyer are suitable for accepting said telephone call.

* * * * *

UNITED STATES PATENT AND TRADEMARK OFFICE
CERTIFICATE OF CORRECTION

PATENT NO. : 5,608,791
DATED : March 4, 1997
INVENTOR(S) : Grecco et al.

It is certified that error appears in the above-identified patent and that said Letters Patent is hereby corrected as shown below:

Column 8,
Line 35, delete "maybe" and insert -- may be --.
Line 55, delete ""crashes"" and insert -- "crashes", --.

Signed and Sealed this

Eighth Day of February, 2005

JON W. DUDAS
*Director of the United States Patent and Trademark Office*